Figure 1:
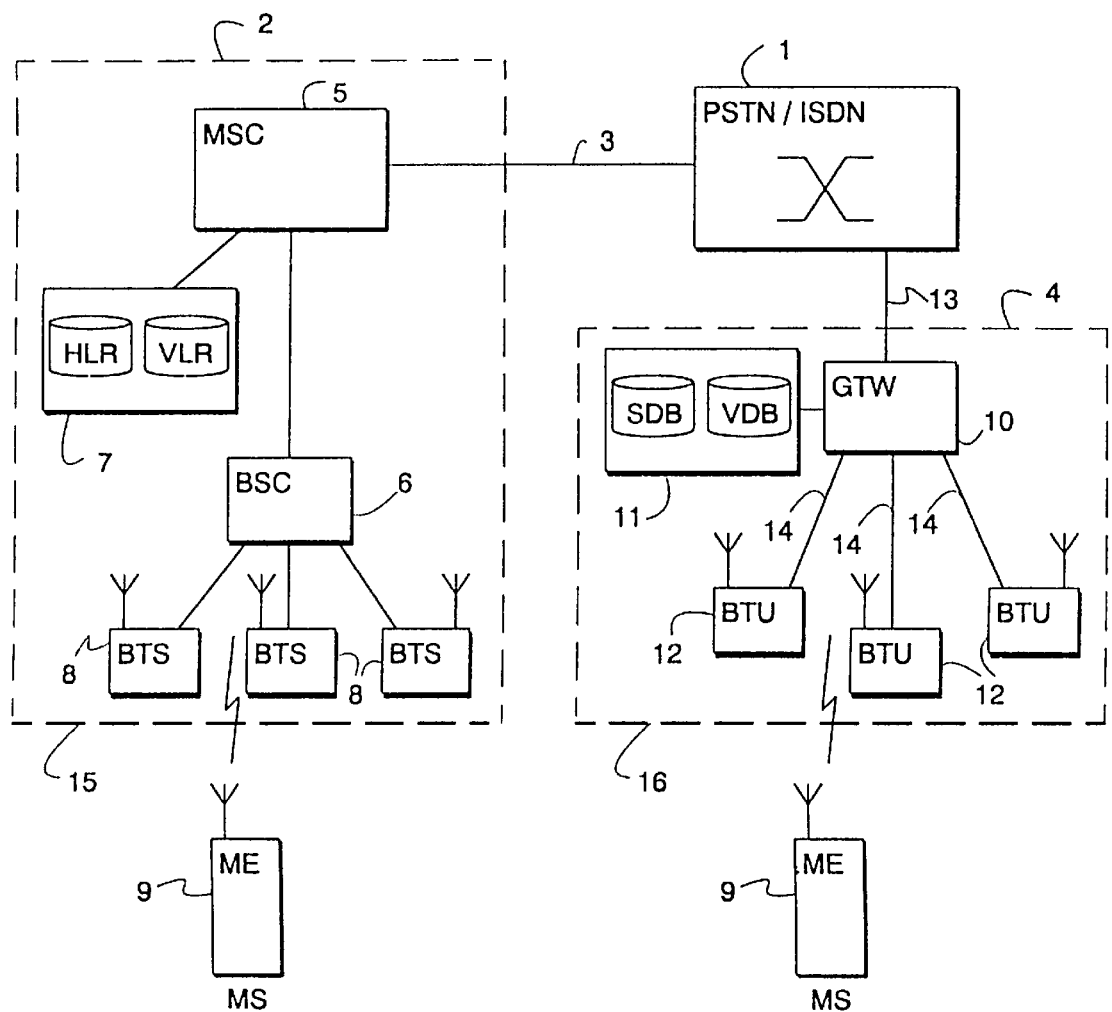

United States Patent [19]

Rautiola et al.

[11] Patent Number: 5,924,030

[45] Date of Patent: Jul. 13, 1999

[54] CELLULAR EXTENSION OF A FIXED COMMUNICATIONS NETWORK

[75] Inventors: Markku Rautiola; Jouni Mikkonen, both of Tampere, Finland

[73] Assignee: Nokia Mobile Phones Limited, Salo, Finland

[21] Appl. No.: 08/710,020

[22] Filed: Sep. 11, 1996

[30] Foreign Application Priority Data

Sep. 29, 1995 [FI] Finland ................................ 954637

[51] Int. Cl.$^6$ .............................. H04Q 7/26; H04B 1/38
[52] U.S. Cl. ..................... 455/426; 455/435; 455/462; 455/552
[58] Field of Search .................... 455/403, 411, 455/422, 435, 462, 463, 464, 517, 524, 554, 555, 426, 515, 552

[56] References Cited

U.S. PATENT DOCUMENTS

| | | | |
|---|---|---|---|
| 5,179,721 | 1/1993 | Comroe et al. | 455/426 |
| 5,210,787 | 5/1993 | Hayes et al. | 455/435 |
| 5,257,257 | 10/1993 | Chen et al. | 370/441 |
| 5,325,419 | 6/1994 | Connolly et al. | 455/435 |
| 5,371,898 | 12/1994 | Grube et al. | 455/426 |
| 5,384,824 | 1/1995 | Alvesalo | 455/456 |
| 5,475,735 | 12/1995 | Williams et al. | 455/435 |
| 5,479,483 | 12/1995 | Furuya et al. | 455/435 |
| 5,699,407 | 12/1997 | Nguyen | 455/462 |
| 5,771,459 | 6/1998 | Demery et al. | 455/517 |

FOREIGN PATENT DOCUMENTS

| | | |
|---|---|---|
| 0 225 607 | 6/1987 | European Pat. Off. . |
| 0 462 728 A3 | 12/1991 | European Pat. Off. . |
| 0467534 A2 | 1/1992 | European Pat. Off. . |
| 0725552 A2 | 8/1996 | European Pat. Off. . |
| WO 93/20642 | 10/1993 | WIPO . |
| WO 94/17644 | 8/1994 | WIPO . |
| WO 94/28688 | 12/1994 | WIPO . |
| WO 95/20299 | 7/1995 | WIPO . |

*Primary Examiner*—Willis R. Wolfe
*Attorney, Agent, or Firm*—Perman & Green, LLP

[57] ABSTRACT

The present invention concerns an equipment and a method for providing in connection with the fixed communications network (1) a small cellular extension (4), wherein the same kind of radio frequency mobile communication devices (9) can be used as in regular cellular networks (2), in other words, the radio interface (16) of the cellular extension (4) is similar to the radio interface (15) of the regular cellular networks (2). The cellular extension (4) comprises database means (11) for registering the subscribers and for transmitting the calls to the subscribers located in the cellular extension (4) based on the connections between the ISDN numbers of the cellular network determined for the cellular extension (4) and stored into the database means (11), and the IMSI codes of the subscribers. The invention doesn't require the same kind of signaling between the cellular extension and the regular cellular network as used in the regular cellular network (2) for implementing the data transfer between the mobile switching centers (5) and between the mobile switching centers (5) and the registers (7).

8 Claims, 3 Drawing Sheets

SDB

| ISDN | IMSI | STATUS |
|---|---|---|
| 931 3151515 | 244 50 555555 | ON |
| 931 3151514 | 244 50 555967 | EI |
| 931 3151517 | 244 50 555479 | ON |
| ... | ... | ... |

VDB

| ISDN | IMSI | STATUS |
|---|---|---|
| 931 3151515 | 244 50 555311 | ON |
| 931 3151515 | 244 50 555245 | ON |
| 931 3151514 | 244 50 555417 | ON |
| ... | ... | ... |

Fig. 3

CELLULAR EXTENSION OF A FIXED COMMUNICATIONS NETWORK

The present invention is related to communications systems comprising fixed communications networks and cellular mobile communications systems and more particularly the invention is related to the cellular extension of a fixed communications network.

The present mobile communications systems are mainly cellular systems, their special advantage being the ability to manage the mobility of the subscriber within the whole area of the system. The latest cellular mobile communications systems, such as the european GSM system (Groupe Speciale Mobile) that is at the moment under construction, are intended to cover very large areas. At the same time their completely digital implementation makes it possible to offer multiple services to the subscribers. Since the digital cellular mobile communications systems such as GSM are totally new systems, their implementation requires construction of new networks, thereby especially expensive being the building of the base station systems and extending their coverage to the intended coverage area as widely as possible and, on the other hand, offering the required capacity in areas where the new system has a large number of users.

Since the network operators have to make big investments to build up a covering network with a sufficient capacity, it is clear that this increases the operation costs of the network which, naturally, have to be paid in the end by the network users as high tariffs. The high tariffs, however, restrict the use of the network and getting new subscribers to the system. Thus, the network operators must consider very carefully the network investments and therefore the coverage of the network is only slowly extended outside the centers and dense traffic roads, which has an adverse effect on the marketing of the services of the system to new subscribers.

In addition to that the tariffs of the new cellular systems are high and the coverage despite the high tariffs is inadequate or the capacity in large centers insufficient, one problem from the subscribers point of view is also the fact that the mobile communication devices are expensive and, furthermore, the subscriber also needs terminal devices of other communications networks. An advantage of the fixed networks is their good coverage and their inexpensive tariffs, because the required infrastructure mostly already exists. In addition, the so called wireless systems which offer to a certain extent mobility management and reliability for the mobile use, suit the need of many subsribers. Furthermore, such systems offer cheaper services, since they utilize the exsting infrastructure of fixed systems. One drawback of the wireless systems is, however, that their own special terminal devices are needed.

Awareness of the above described problems has brought the inventors to seek a solution that provides a profitable expansion of the capacity and services of the communications system by using the existing infrastructure of fixed communications networks and the similarly existing technology and terminal devices of the regular cellular system. In the following, some solutions of prior art are dealt with, that at least to some extent aim at the same objects as the present invention described later.

The european standard concerning the digital radio access DECT (Digital European Cordless Telecommunications) aims in particular at developing and standardizing wireless systems. By means of the radio interface specified by this standard, it is the purpose to accomplish a uniform wireless access to private or public fixed networks. Typical objects of the systems according to the DECT standard are wireless home and business systems. The present invention is associated with the same kind of applications, but it provides a new approach to their implementation, avoiding e.g. the above mentioned drawback of wireless systems, that a special terminal device of the system is needed. The invention aims, like wireless systems as well, at using the existing profitable infrastructure of the fixed networks. The wireless systems based on the DECT standard have also other similarities compared with the system in accordance with the present invention have also other similarities, to be referred to later in this application.

In EP publication no. 462 728 a solution associated with the PCN concept is described. PCN (Personal Communications Network) can be based e.g. on the GSM standard, which is based on a traditional cellular system with, however, a smaller average cell size and other differences allowing a larger capacity. This publication provides a solution in which a local base station controller of this kind of a regular cellular network is connected to the local fixed network. The objective of the solution is that the connections between the mobile stations located on the local fixed network area and on the local base station controller's area can be created directly through this base station controller, which has been made more intelligent comprising functions corresponding to those of the mobile switching center and register means. The intelligent local base station system having a direct connection to the local fixed network has a permanent link with the mobile system, subordinated to it. This subsystem only monitors the signalling of the cellular system and controls the local calls directly on that basis. The register means are subordinated to the register means of the regular cellular system and they operate quite equally to the visitor register of the system.

In EP application 225 607 a private radiotelephone system is described, operating in connection of a telephone exchange with the same frequency band as the regular cellular system and being able to use mobile phones of the regular cellular system. Roaming between the systems requires changing of the operation mode of the telephone by means of a mode switch. It doesn't appear from the publication, whether the idea is that the radio interface of the private system is the same as the one of the regular cellular system or compatible therewith, but proposing a mode switch implies that the radio interfaces of the radiotelephone system and the regular cellular system are different. Neither roaming between the two systems nor the parts and operation of the private system in general are described in details in the EP publication 225 607.

In order to achieve the above mentioned goal, the invention is related to a communications system including at least one fixed communications network and one regular cellular network and having a cellular extension combined with the fixed communications network, primary embodiment of said extension comprising one or several base station units and a gateway unit being connected from one end to the fixed network and from the other end to said one or several base station units. An essential feature of the invention is that the cellular extension provides for the users a radio interface that is compatible with the interface of the regular cellular mobile communications system, so that it is possible to use one and the same mobile station both in the common mobile communications system and in the cellular extension. The regular cellular system can be e.g. GSM, DCS 1800 or US-TDMA. The gateway unit on one hand controls the operation of the cellular extension and on the other hand operates as a protocol converter between the cellular extension and the fixed network. The connection of the fixed network the gateway-unit is connected with, has one or several ISDN numbers of the fixed network or corresponding connection identification numbers.

Another substantial feature of the invention is the database arrangement in the cellular extension, through which the subscribers can be registered into the cellular extension of the fixed network simultaneously with the registration to the regular cellular network. Also a subscriber who is not a subscriber of the regular cellular system can be registered to the extension. A subscriber of the regular cellular mobile communications system who is not simultaneously registered into the cellular extension, can be registered as a visiting subscriber into the extension. In the method and system in accordance with the present invention, in order to form communications to a subscriber or a mobile station registered into the cellular extension of the fixed communications network, both the ISDN number (Integrated Services Digital Network) of the fixed network and the IMSI code (International Mobile Subscriptor Identifier) are stored into the subscriber information of the database means included in the gateway unit, in case the subscriber is also a subscriber of the mobile communications system, or the corresponding subscriber identity code, in case the subscriber is a registered subscriber of the cellular extension only. Additionally, also the information, whether the registration of the subscriber registered into the cellular extension is at the moment valid or not, is stored into the database, in other words, whether the subscriber is at the moment located in the cellular extension or has moved away from the extension area. The information on the subscriber registered as a visitor is maintained in the database means of the cellular extension for some time, even if the subscriber has left the cellular extension, so as to avoid unnecessary signalling in case the subscriber returns to the area within a while.

A subscriber registered into the cellular extension can be paged in the interface connecting the cellular extension to the fixed network by means of the ISDN number of the fixed network. A subscriber of the regular cellular system having activated his/her registration into the cellular extension or being registered as a visitor thereto, will be paged in the method and system in accordance with the present invention also with the International Mobile Subscriber Identity code (IMSI). In that case an incoming call to the respective IMSI number of the regular cellular system will be forwarded from the mobile communications system to the said ISDN number of the fixed network and at the same time the subscriber's IMSI number identifying the subscriber forwarding the call will be transferred in a normal way, said IMSI number being connected with said ISDN number of the fixed network in the database means of the cellular extension and being the one according to which the cellular extension pages the right subscriber and connects the call to the right mobile station.

For instance in the GSM system all functions required for this kind of call forwarding and tracking of the subscribers' roaming around have been specified already. Firstly, the so called IMSI detach and IMSI attach procedures are used, whereby the network keeps track of the subscriber's location (or more exactly that of a certain mobile station). By means of the IMSI detach procedure, the mobile station informs in one message that it is leaving the network, whereby the information concerning the mobile station will be erased from the visitor location register and it no more has a location in the network. By means of the IMSI attach procedure, the mobile station can return to the network in some other location, where the information thereof will be entered to the register in question. In the method and system in accordance with the present invention, the IMSI detach procedure is used when roaming from the regular cellular system to the cellular extension of the fixed network, and as a response, a call forwarding procedure, e.g. call forwarding to the respective ISDN number of the cellular extension when the subsriber is not reachable (CFNRc, call forwarding on not reachable), will be activated at the same time in the subscriber's home location register of the regular cellular system.

If the subscriber is also a regular subscriber of the cellular extension, the ISDN number corresponding to the IMSI number of his/her mobile station is already known to the home register of the subscriber. If a subscriber of the regular cellular system is registered as a visitor to the cellular extension of the fixed network, the respective ISDN number of the fixed network must be signalled to the home register of the respective subscriber in the regular cellular system. The procedure is in this case as follows: When a new mobile station comes to the cellular extension, it in any case signals it's IMSI code to the cellular extension. If the gateway unit finds that the subscriber has no registration which means that a visitor is concerned, it signals through the connections of the fixed network a call forwarding to the IMSI code in question in the home register of the subscriber and gives in the forwarding command one ISDN number of the gateway as a target number for the call forwarding. At the same time the information on the subscriber in question is stored into the database of the cellular extension, and the IMSI code of the subscriber is connected to this ISDN number. When the subscriber leaves the cellular extension, the respective subscriber information, in case of a visitor, will be erased from the database, or in case the subscriber is registered into the extension, the information that the subscriber in question is not active in the extension will be added to the subscriber information. If the subscriber leaving is also a subscriber of the regular cellular network, it can return after that to the regular cellular system by using the IMSI attach procedure.

Like the above description shows, the cellular extension of the fixed network operates independently when transmitting calls to the subscribers, not needing any signalling connection into the subscriber registers of the regular cellular network.

One primary embodiment of the present invention is the so called nanocellular extension in office and ho me surroundings. In that case the base station units have a very small power, operating characteristically with less than a milliwatt or closer to the level of a microwatt power, e.g. as units of one room or a couple of adjacent rooms. Correspondingly, the operation of the mobile stations suitable for use in the regular cellular system has to be extended to be able to operate also on this very low power level that is sensible in this kind of an embodiment. A base station unit suitable for this kind of use is, in fact, very close to a modified, adversely operating mobile station. This embodiment of the present invention can be used to complement the regular cellular system on areas, where the base station capacity otherwise would have to be improved e.g. by bringing into use a denser regular cellular network than earlier. At the same time a profitable alternative would be provided, by which the mobile stations of the regular cellular network could be used also in offices or homes with tariffs much lower than those of the regular cellular network. Namely, the cellular extension in accordance with the present invention uses mainly the resources of the fixed network and rests only a little on the use of the resources of the regular cellular network. As there are very low power levels used in this embodiment, the simultaneous operation of it and the regular cellular network would do no harm to the operation of either of them. A second embodiment would be the extension of the mobile communication services to remote areas, e.g. to summer cottage and other areas where there are usually only a few users of the mobile stations or the use is occasional. Base station powers could in this case be matched according to the need. By means of the fixed network cabling extended practically almost everywhere and the twisted pair wire connections, cellular extensions could be implemented for serving subscribers of the regular cellular network or other subscribers to be registered into the cellular extension in areas, where the extension of the mobile communications network would otherwise not be profitable.

Summarized, by means of the cellular extension of the fixed communications network in accordance with the present invention the following advantages can be gained. The infrastructure of the fixed network is favourably used therein, in order to implement services supplementary to the regular cellular system or substituting the same. By means of the cellular extensions e.g. the need of a completely new cellular planning or building new base station networks can be avoided in centers, where the base station capacity otherwise should be added. By means of a cellular extension the usability of a mobile station can be extended also to remote places, where the regular cellular network economically can't be extended to. As the cellular extension mainly uses the resources of the fixed network and the base station units with often very low powers, required by the extension itself and the gateway unit, can be implemented with very reasonable costs, services can be offered to the subscribers by means of the cellular extension with lower tariffs than in the cellular system itself. Because in accordance with the present invention one and the same radio interface can favourably be used e.g. both in the office and at home, the subscriber can take better advantage of the mobile station of the regular cellular system, the device in itself being a relatively expensive investment.

Figure 2A:
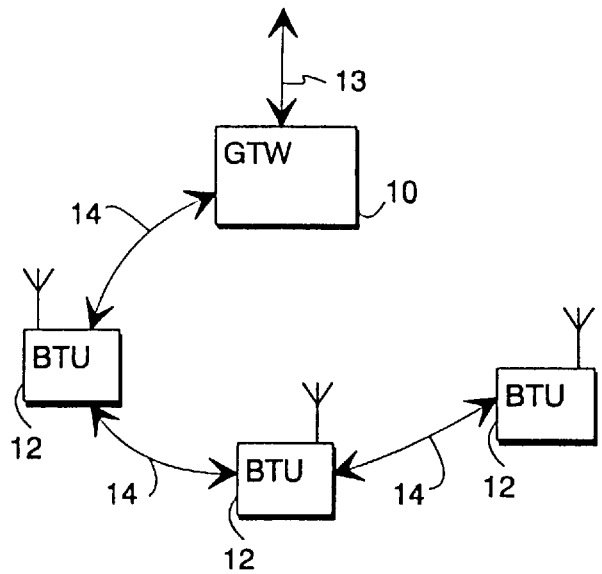
Figure 2B:
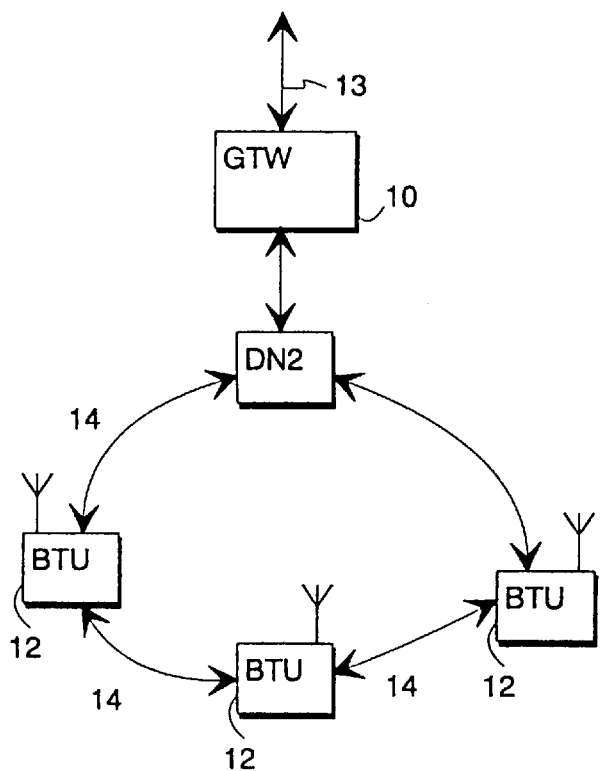

The preferred embodiments of the method and system in accordance with the present invention will be described in more detail in the following, with reference to the accompanying drawings, wherein:

FIG. 1 illustrates schematically a communications system in accordance with the invention, comprising a regular cellular system and a cellular extension of a fixed network, FIGS. 2(a) and 2(b) illustrate two alternative embodiments of the connections between the gateway unit of the cellular extension and the base stations, and FIG. 3 illustrates as a table the connection of the ISDN and IMSI numbers included in the database in accordance with the invention.

FIG. 1 illustrates schematically a communications system in accordance with the present invention, comprising at least one fixed communications network 1, that can be e.g. a traditional telephone network PSTN or a digital multiservice network ISDN. The communications system further comprises a mobile communications system 2 of a regular cellular type, later in this application shortly referred to as a regular cellular system or just a cellular system. The cellular system 2 of the described embodiment comprises at least one mobile switching center 5 and at least one base station system comprising a base station controller 6 and base stations 8. The cellular system 2 offers a radio interface for the mobile stations 9, said interface being in FIG. 1 indicated by a bold dashed line 15. The radio interface refers here to all those frequency, timing, framing, signalling and coding procedures that must already be agreed on before two radio devices can communicate with each other. In addition, the cellular system 1 includes the subscriber database means 7, where the mobile subscriber identity code (IMSI) and the information on the subscribers location in the cellular system or eventually the call forwarding information, in case the subscriber has left the cellular system, will be connected to the mobile station number (MSISDN) of the subscriber marked with MS. The cellular system can be e.g. the GSM system offering a radio interface in accordance with the GSM specifications, the subscriber database means in that case comprising e.g. the Home Location Register HLR and the Visitor Location Register VLR, the Home Location Register and the subscriber information included therein being primarily used in the present invention.

The present invention is primarily related to a cellular extension 4 connected to the fixed communications network 1 with connection 13, said cellular extension 4 being in the primary embodiment of the invention implemented as a kind of simplified and small sized cellular system that could be therefore called e.g. a nanocellular network. The cellular extension comprises a gateway unit 10 connected to the fixed network through said connection 13, said gateway unit 10 performing in this simplified system tasks of the Mobile Switching Center and the base station controller in the direction of the mobile stations communicating with the cellular extension and operating as a protocol converter between the cellular extension and the fixed network. The base station units 12 are connected to the gateway unit 10 and they offer to the mobile stations 9 a radio interface 16 marked by the bold dashed line. Substantial for the invention is that the radio interface 16 of the cellular extension 4 is compatible with the radio interface 15 of the regular cellular system 2, so that it is possible to use one and the same mobile station in both of them. Also substantial for the invention is that the cellular extension comprises database means 11 which makes it possible for a subscriber MS of the regular cellular system 2 to be registered also as a subscriber to the cellular extension 4 or to visit the cellular extension.

The connection 13 between the fixed network 1 and the cellular extension 4 is in the primary embodiment of the invention a connection that uses a data rate of 2 Mbit/s. One possible solution is in that case that the gateway unit 10 is close to the local exchange of the fixed network, whereby the interface to be used by the connection can be V2 for the analogue connection and V5.1 or V5.2 for the digital connection. The said interfaces are standardized ETSI interfaces (European Telecommunication Standard Institute) and specify the signalling and transfer protocols between the gateway unit 10 and the fixed network 1. In the ISDN network one possible solution could also be that the gateway unit 10 is also an ISDN terminal device, whereby the connection 13 could be an ISDN connection of e.g. a PRI (Primary Rate Interface) type comprising channels 30B+1D with a total transfer rate of 2 Mbit/s. In this case the gateway unit 10 could be close to the base station units 12 and also integrated into one of the base station units.

One basis for the invention is to make use of the twisted pair copper wires of the fixed network for implementing connections 14 between the gateway unit 10 of the cellular extension and the base station units 12. Also for these connections the required transfer rate is 2 Mbit/s, which is not fulfilled by the codings and protocols used in the traditional wired telephone traffic, but e.g. the HDSL protocol (HDSL=High bit-rate Digital Subscriber Line) should be used instead, by which the required high transfer rate can be implemented in both directions. Other possible solutions are the ATM (Asynchronous Transfer Mode) using twisted pair wires or the ADSL (Asymmetric Digital Subscriber Line). The maximum length of the transmission lines in the HDSL implementation can be of the order of 4 kilometers. The problems arising from this restriction can in some cases be solved by using a chain system for the implementation of the connections 14. These alternative implementations are illustrated in FIGS. 2(a) and 2(b), where the base stations are connected in the first one into a chain and in the second into a loop, so that they can further be connected to the gateway unit 10 by means of the node DN2. DN2 in itself is a trade name of Nokia Telecommunications Oy and instead of the node it refers to, any other corresponding equipment for multiplexing the data transmission lines can be used.

As already stated above, one primary embodiment of the invention is the so called nanocell extension e.g. in offices or apartments. The base station units 12 can in that case be units covering only one room or some rooms and they can be profitably implemented simplified and with very low powers. The base station unit can operate with a power of less than one milliwatt and in accordance with the primary embodiment it comprises only one transmitter-receiver, in other words, it can operate only with one frequency band at a time and offer for the use of the mobile stations e.g. 8 channels when using a GSM compatible radio interface, each of the channels corresponding one TDMA timeslot according to the GSM standard (Time Division Multiple Access). The whole cellular extension 4 or a part of its base station units 12 can overlap the regular cellular network, in other words be e.g. inside one of its cells. It is clear that in that case the base station units 12 of the cellular extension are provided with the frequencies that are not in use of the base stations 8 of the regular cellular network overlapping the cellular extension area 4, in order to avoid confusions in specifying if a certain connection should be effected through the base station of the regular cellular network or through the cellular extension in accordance with the invention.

The gateway unit 10 and the base station units 12 take care that the cellular extension 4 uses towards the mobile stations signalling and transfer protocols that are in compliance with the specifications of the regular cellular system 2. This is a substantial feature of the invention, because in that case the mobile station 9 or the user thereof doesn't even have to know if the connection is effected through the base station 8 of the regular cellular network or through the cellular extension 4 in accordance with the invention. The gateway unit 10 operates as a protocol converter converting the signalling and protocols to correspond the interface used by the connection 13. In some respects also exceptions are possible. It is e.g. profitable in the cellular extension to use dynamic channel allocation that is not generally used in the mobile communications systems, but is e.g. in the DECT standard specified for use in the wireless systems. E.g. the GSM specification opens the possibility for the base stations 12 to measure the RF reception level on unallocated channels, and to transmit the information thereof regularly to the gateway unit 10. The gateway unit can take the information about the interference level of the uplink channels, i.e. that of the signals transmitted by the mobile stations 9, into account in channel allocation or when making decision on changing the channel. Decision-making on the channel allocation or on the channel changing can also be decentralized and inside the cell totally transferred to the base station units 12 of the cell in question. The dynamic channel allocation requires overcapacity of some degree, in other words, free channels inside the cellular extension, to gain some advantage. Its use can, however, make the network planning easier and help to obtain a kind of automatic channel planning between the cells.

As already stated in the general part of the application, the present invention makes it possible for a subscriber MS of the regular cellular network 2 to be registered as a subscriber also to the cellular extension 4 of the fixed network. In the same way it also makes it possible for those subscribers of the regular cellular system 2 who have not been registered as subscribers into the cellular extension 4, to visit the cellular extension 4. The cellular extension in accordance with the present invention can also have subscribers that have been registered only into the cellular extension. The cellular extension 4 has one or more, usually more, ISDN numbers in the fixed network 1, and according to the primary embodiment of the invention, every subscriber registered into the extension 4 has his/her own ISDN number of the fixed network, by which the subscriber visiting the extension at the moment can be reached. Generally, each of the ISDN numbers defined for the cellular extension 4 in the fixed network corresponds one eventual connection between the subscriber being registered into the cellular extension and some other subscriber. Calls for those subscribers of the regular cellular system who are visiting the cellular extension 4 are forwarded to some ISDN number of the extension in a way described in more detail later.

For registering the subscribers and storing the visitors' subscriber information the cellular extension 4 in accordance with the present invention comprises subscriber database means 11. The information included in the database means 11 can be divided e.g. into two parts, the information on the subscribers registered into the cellular extension 4 being stored into the part SDB (Subscriber DataBase) and the information on the subscribers visiting the cellular extension being stored into the VDB (Visitor DataBase). FIG. 3 shows schematically a part of the contents of the subscriber database 11. In addition to the information presented therein also other information is needed in the database means 11, but only information shown in FIG. 3 is used for illustrating the following description.

In the part SDB concerning the subscribers registered into the extension, the ISDN number given to the subscriber in the cellular extension is connected to the subscriber identity code IMSI received by the mobile subscriber in the regular cellular network. In addition, the database includes a status information STATUS, that is the information, whether the registering is valid or not, in other words, whether the subscriber at the moment is present in the extension. If a subscriber is concerned who is registered only into the cellular extension, the IMSI code of the regular cellular network can be replaced e.g. by a subscriber identity code formally equal to the IMSI code but usable only in the cellular extension. In that case, however, certain identity codes formally equal to the IMSI code for the internal use of the cellular extension 4 have to be reserved through an agreement with the cellular network operator. In the part VDB of the database concerning the visitors, the IMSI code of a visiting subscriber of the regular cellular network can be connected in principal with any ISDN number of the extension. The operation of the database 11 in regard to the visitor part VDB can be implemented so that the subscriber data is erased immediately after the subscriber has left the cellular extension 4. In that case the status information is, in fact, not necessary, because the subscriber is always in the extension, when the data is included in the database. In an alternative embodiment the data of the subscriber registered as a visitor is maintained for a while in the visitor part VDB of the database, even if the subscriber had left the cellular extension area, so as to avoid unnecessary signalling in case that the subscriber returns to the area within a short time.

In addition, also information on the location of the subscriber in the cellular extension is registered into the database means 11. Like the regular cellular system, also this system has three alternatives. The whole cellular extension 4 can be determined as a location, whereby in case of an incoming call, the paging messages are transmitted to all cells of the cellular extension 4, in other words through all the base stations 12, and it is also not necessary to register the location of the subscriber separately to the database means 11. A second alternative is that the cellular extension 4 is divided into location areas comprising a plurality of cells, and a third alternative is that the location is defined with an accuracy of one cell, whereby the paging messages are sent to the subscriber only to the cell that at the moment is registered as the location of the subscriber. As the cellular extension of the nanocellular type has typically maybe one or two subscribers in one cell, it is profitable to define the location with an accuracy of one cell, because in that case only a few paging messages come to one cell and, correspondingly, the mobile communication devices located in the cell must use only a very small amount of power for the interpretation of the paging messages.

One basic point of view of the invention is also that the connection 3 between the fixed network 1 and the regular cellular network 2 doesn't need that kind of signalling, e.g. a SS.7 signalling, and the MAP-B connection used between different mobile switching centers, through which access would be gained to the subscriber database 7 of the cellular extension, that is, primarily to the information included in the home location register HLR. This kind of starting point has been chosen, because the required signalling connection, taken into account the present operations of the fixed networks, would not have been available and the MAP-B protocol developed for the communications between the different mobile switching centers (MSC) and between a mobile switching center 5 and the database 7 is not intended for arranging this kind of a signalling. Thus, with help of the own database means 11 of the cellular extension, its operation has been made as independent as possible.

The management of the subscriber's location between the mobile communications network and the cellular extension of the fixed network and call forwarding on subscribers takes place as follows. First we deal with a subscriber that is a subscriber both in the regular cellular network 2 and the cellular extension 4. When this kind of a subscriber leaves the regular cellular network 2, the used mobile station 9 informs about the leaving with a certain message known e.g. in the GSM system as an IMSI detach message. Then the information on the mobile station 9 in question will be erased from its current visitor register in the database 7 of the cellular network and it no more has a location in the network 2. As the subscriber is a registered subscriber also in the cellular extension 4, the regular cellular network 2 interprets the IMSI detach message automatically so that the subscriber has roamed into the cellular extension. Then the automatic call forwarding is activated in the database 7 in the home location register of the subscriber to the ISDN number of the cellular extension 4 registered for the subscriber, the ISDN number in question being stored to the home location register when the subscriber was registered as a permanent subscriber into the cellular extension.

If the subscriber of this example, when leaving the regular cellular network 2, really roamed to the cellular extension 4, the used mobile station has informed the gateway unit 10 with a certain message (in the GSM system the IMSI attach message) about its arrival in the cellular extension 4. Then the status information of the subscriber in the database 11 will be YES, and when the calls given by the above mentioned call forwarding are forwarded to the subscriber in the corresponding ISDN number given to the cellular extension 4 on account of the home local register of the cellular network, the call is forwarded to the right mobile station in the cellular extension on account of the IMSI code found on the corresponding line of the home location register of the database 11 (compare FIG. 3). If the subscriber has not roamed into the cellular extension 4 but left totally out of reach, the status information in the database 11 remains NO (compare FIG. 3, part SDB, 2. line) and the call forwarded to him/her generates a usual "subscriber not reachable" procedure specified in the standards of the regular cellular system.

In the following we deal with a subscriber who is registered as a subscriber into the regular cellular network 2 but not into the cellular extension 4. When this kind of a subscriber leaves the regular cellular network 2, the used mobile station 9 informs again about the leaving with an IMSI detach message, whereby the information on the mobile station 9 in question will be erased from its current visitor location register of the cellular network database 7 and it no more has a location in the network 2. In case the subscriber doesn't roam into the cellular extension 4, the operation in the cellular network 2 is quite in accordance with the standard and is in no way associated with the present invention. If the subscriber roams into the cellular extension 4, his/her mobile station informs this through the base station 12 of the cellular extension to the gateway unit 10 by using the IMSI attach message that includes the IMSI code of the mobile station. Then the gateway unit 10 checks if one of the ISDN numbers determined for the cellular extension 4 in the fixed network 1 is free. If not, the IMSI attach message doesn't generate registration of the subscriber as a visitor to the cellular extension 4. If there are free ISDN numbers, the gateway unit 10 registers the arrived subscriber as a visitor to the visitor part VDB of the database 11.

To make the call forwarding on the mobile station of the visiting subscriber possible in the cellular extension 4, the information on the registration of the visitor and on the ISDN number of the cellular extension 4 determined to him/her temporarily has to be sent to the visitor's home location register in the database 7 of the regular cellular network 2. According to the present invention this does not require the same kind of signalling (e.g. SS.7) that is used in the communication between the switching centers 5 of the cellular network, because it can't be assumed that the common telephone network 1 would support this kind of signal transmission. Instead, the gateway unit 10 sends a call forwarding through the fixed network 1 to the switching center 5 of the regular cellular network identified on account of the IMSI code of the visiting mobile station, and this call forwarding forwards the incoming calls to the cellular network from the IMSI code of the visiting mobile station to the ISDN number of the cellular extension 4 determined temporarily to the visitor. When the visitor then leaves the cellular extension 4, the gateway unit 10 sends correspondingly a call forwarding cancellation to the database of the cellular network and erases the visitor information from the visitor part VDB of the database 11, after which there is no difference from the point of view of the invention whether the subscriber will be registered again into the regular cellular network or not.

If the subscriber for some reason is not at all registered as a subscriber into the regular cellular network 2, but only as a subscriber into the cellular extension 4, in other words he/she has no home location register in the databases 7 of the cellular network 2, the situation is just the opposite of the situation described above. The mobile station that is intended to be used both in the regular cellular network 2 and in the cellular extension 4 must in any case have a registered IMSI code. When this kind of a mobile station leaves the cellular extension 4, the IMSI detach message sent by it generates an entry NO (compare FIG. 3) into the column STATUS of the subscriber in the home register SDB of the database 11, whereby the gateway unit 10 forwards the calls coming to the mobile station on account of the ISDN number to the regular cellular network 2.

The eventual roaming of the mobile station to the regular cellular network, in other words the IMSI attach message sent through one of the base stations 8 to a certain mobile switching center 5, generates the registration of the mobile station in question as a visitor to the visitor part VLR of the database 7 supported by the center in question, on the basis of which the cellular network 2 can forward the calls to the mobile station in the known way. If the mobile station, after having left the cellular extension 4, won't be registered as a visitor to any database 7 of the regular cellular network, no location and no other identifying information will be determined to it in the cellular network, so that it will not be reached, although the calls are forwarded from the gateway unit 10 of the cellular extension 4 to the cellular network.

When this kind of a mobile station returns to the cellular extension by sending an IMSI attach message to the gateway unit, it receives the status YES and the gateway unit 10 forwards the calls to it as usual.

Finally we will deal with creating a telephone connection between two mobile stations located in the cellular extension 4 in accordance with the present invention. This kind of a connection can be created in the gateway unit 10 so that when a mobile station 9 located in the cellular extension wants a connection to some other mobile station, the gateway unit 10 first checks if the IMSI code of the target mobile station is stored into the database means 11 and if yes, it checks whether it has the status YES, in other words, whether the mobile station in question is registered into and operating within the area of the cellular extension 4. If the gateway unit 10 finds that both the calling mobile station and the called mobile station are in the cellular extension 4, it connects the call directly without transmitting it through the fixed network 1 or the regular cellular network 2.

We claim:

1. A communications system comprising:
    a fixed communications network (1),
    a regular cellular network (2) with a connection (3) to said fixed communications network (1) said regular cellular network comprising a first radio interface (15) for mobile communication devices (9) and first subscriber data base means (7) for connecting the mobile station number (MSISDN) of the subscriber (MS) of the regular cellular network with the corresponding mobile subscriber identity code (IMSI) and for storing the information concerning the location of the subscriber in the cellular system (2) or, in case the subscriber has left the cellular system, for storing the call forwarding information, in order to forward the call to said subscriber (MS), and
    a cellular extension (4) connected to the fixed communications network (1), said cellular extension (4) having in the fixed network (1) one or several call forwarding numbers (ISDN), whereby all incoming calls to the cellular extension (4) are forwarded through the fixed communications network (1) to one of said connection identification numbers (ISDN) of the cellular extension, characterized in that said cellular extension (4) comprises
    a second radio interface (16) compatible with said first radio interface (15), so that one and the same mobile communication device (9) can be used both in the regular cellular system (2) and in the cellular extension (4) of the fixed communications network (1), and
    second subscriber database means (11) for connecting the mobile subscriber identity code (IMSI) of the regular cellular network subscriber (MS) located in said cellular extension with one of said connection identification numbers (ISDN) of the cellular extension (4) in order to forward the calls to said subscriber (MS).

2. A communications system in accordance with claim 1, characterized in that said cellular extension (4) further comprises means (10) for creating and sending a connection identification command including said mobile subscriber identity code (IMSI) and said one of the connection identification numbers (ISDN)—as a response to the arrival of said subscriber (MS) to the cellular extension (4)—through the fixed network (1) to the regular cellular system (2) for registering the call forwarding information into the subscriber information of said subscriber (MS) in the first subscriber database means (7) and for activating the all forwarding.

3. A communications system in accordance with any of the foregoing claims, characterized in that said cellular extension (4) comprises
    control means (10) for controlling its operation and for creating a connection (13) with said fixed communications network, and
    at least one base station (12) being connected (14) with said control means (10) for offering said second radio interface (16) to the mobile communication devices (9) and for transmitting information between said mobile communication devices (9) and said control means (10).

4. A communications system in accordance with claim 3, characterized in that the coverage area determined by the transmitting power of the base station (12) is small covering substantially a few rooms inside a building.

5. A communications system in accordance with claim 3 or 4, characterized in that said base station (12) operates substantially on one transmitting and one receiving frequency band at a time.

6. A method for moving the location of the mobile subscriber (MS) from the regular cellular network (2) to the cellular extension (4) of the fixed network and for forwarding a call coming to said subscriber in the regular cellular network to said subscriber in the cellular extension (4) in the communications system, said method being characterized in that it consists of the phases where:
    a) the mobile subscriber (MS) leaves the regular cellular system (2),
    b) the mobile station (ME) of the subscriber (MS) signals the mobile subscriber identity code (IMSI) to the cellular extension (4),
    c) the cellular extension (4), in case the subscriber (MS) has earlier been registered into the cellular extension, activates the registration of the subscriber in the second subscriber database means (1) included therein, or in case the subscriber (MS) is a visitor, forms the subscriber information into said second subscriber database means (11), whereby the subscriber identity code (IMSI) of the subscriber (MS) will be connected with one of the call forwarding numbers (ISDN) of the cellular extension.

7. A method in accordance with claim 6, characterized in that therein further d) said cellular extension (4) forms a call forwarding command including the mobile subscriber identity code (IMSI) of the arrived mobile subscriber (MS) and said one of the connection identification numbers (ISDN) and sends it through the fixed network (1) to the regular cellular system (2).

8. A method in accordance with claim 7, characterized in that therein further e) the regular cellular system (2), as a response to said call forwarding command, registers the corresponding call forwarding information into the subscriber information of the subscriber (MS) in question in the first subscriber database means (7) and activates the call forwarding, f) as a response to a call coming to the mobile station number (MSISDN) of the subscriber (MS), the regular cellular system forwards the call according to the call forwarding information included in the first subscriber database means (7) to said one of the connection identification numbers of the cellular extension (4) and signals along with the call the mobile subscriber identity code (IMSI) as identity information of the call forwarding subscriber, and g) the cellular extension (4) forwards based on the subscriber identity code (IMSI) the call to the mobile subscriber (MS) located in the cellular extension.

\* \* \* \* \*

UNITED STATES PATENT AND TRADEMARK OFFICE
CERTIFICATE OF CORRECTION

PATENT NO. : 5,924,030
DATED : July 13, 1999
INVENTOR(S) : Rautiola et al.

It is certified that error appears in the above-identified patent and that said Letters Patent is hereby corrected as shown below:

IN THE CLAIMS:

In Column 12, line 30, delete "all" and insert --call--. (Claim 2)

In Column 12, lines 32-33, delete "any of the foregoing claims" and insert --claim 1--. (Claim 3)

In Column 12, line 49, delete --or 4--. (Claim 5)

In Column 13, line 1, delete "(1)" and insert --(11)--. (Claim 6)

Signed and Sealed this

Fifteenth Day of February, 2000

Attest:

Attesting Officer

Q. TODD DICKINSON

Commissioner of Patents and Trademarks